R. J. FALCONER.

COUPLING FOR HOSE.

No. 2,181. Reissued Feb. 27, 1866.

UNITED STATES PATENT OFFICE.

RALPH J. FALCONER, OF WASHINGTON, DISTRICT OF COLUMBIA.

IMPROVEMENT IN HOSE-COUPLINGS.

Specification forming part of Letters Patent No. 9,768, dated June 7, 1853; Reissue No. 2,181, dated February 27, 1866.

*To all whom it may concern:*

Be it known that I, R. J. FALCONER, of Washington, in the county of Washington and District of Columbia, have invented certain new and useful Improvements in Coupling Water-Hose; and I hereby declare that the following is a full, clear, and exact description of the same, reference being had to the accompanying drawings.

It is well known that with the hose-couplings now in common use great difficulty is encountered in effecting a junction or coupling while the water is flowing through the hose, and in the cases where a head of water, force-pumps, or fire-engines are employed to force the water it becomes necessary to stop the engine, or the supply must be shut off above the break in the line of hose. At the present time there is but one kind of coupling in use by the fire departments throughout the country—viz., the screw-coupling. It is found to be objectionable for several reasons, but still is retained in general use for want of a better. With the screw-coupling in use there is not only loss of time in shutting off the water, but it requires considerable time to "set it up" and complete the joint. In such an emergency as a fire expedition is of high importance, and it has been found by actual experiment with my new coupling that there is no necessity of shutting off the water, and that the coupling can be made with the water flowing, no matter how forcibly, and that the joint is set up and made tight by a single blow from a mallet, and the joint may be broken with equal facility.

Figure 5:
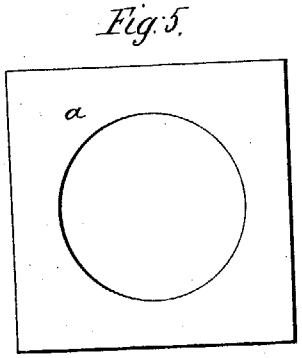
Figure 4:
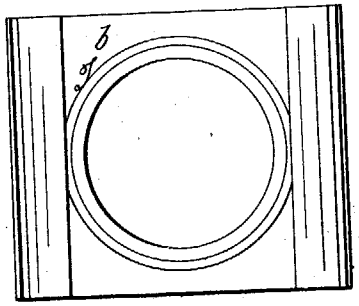
Figure 1:
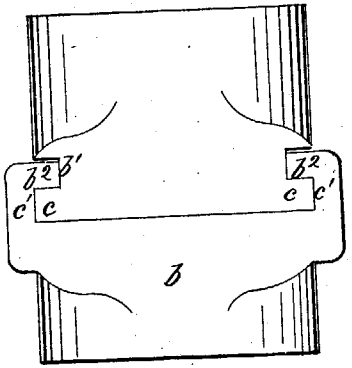
Figure 2:
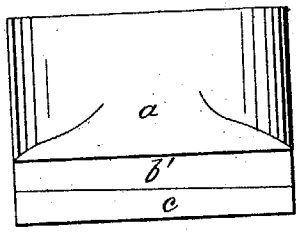
Figure 3:
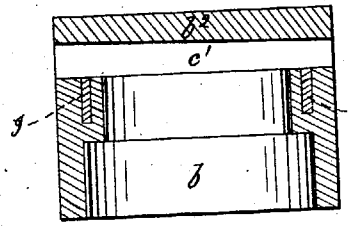

Figure 1 is a plan of the coupling, of which *a* and *b* are the principal parts, showing the coupling-joints in cross-section; Fig. 2, a lengthwise section of the joint of *a*; Fig. 3, the same of *b*; Fig. 4, an end or face view of the part *b*; Fig. 5, the same of *a*.

In Fig. 1 the parts *a* and *b* are shown as locked together. *a* is the male part of the hose-coupling; *b* the female part. From the opposite sides of the face of the female part *b* project the recessed ears or holding devices $b^2$, as shown in Figs. 1, 3, and 4. These holding devices have a tapering recess or groove, as shown in Figs. 1 and 3, into which the tapering flanges *c c* of part *a* slide. The flanges enter the grooves loosely at first, and by their wedge form draw the male and female parts together, fitting tightly when the faces of *a* and *b* are opposite to each other, so that the water-courses of the two sections correspond.

In the face of one of the parts, *b* for instance, as shown in section in Fig. 3, a groove, I, is sunk to receive an embedded washer of leather, vulcanized rubber, or other suitable material, by which the joint is made water-tight. When the washer is of leather, it need not rise but a trifle above the plane of the face of the coupling, as the water immediately swells it; but when made of rubber or material impervious to water a little more projection is necessary. The pressure of the face of part *a* against the embedded washer insures a water-tight joint. This mode of adapting the washer to the face-couplings insures the washers being always in place, as it can be forced or hammered into the sunken groove and rendered very firm.

I I is a circular groove in part *b* (shown in section in Fig. 3) to receive a washer of leather, vulcanized rubber, or other suitable material, to assist in keeping the joint tight.

It will be obvious that this coupling offers the utmost facility for effecting a junction at all times, but more particularly is its advantage realized when a junction is to be made while the water is flowing through the hose.

Where it is necessary to bring the two parts of a hose-coupling together in a direction exactly opposite to that of the flow of the water, it is obvious that the whole force of the stream must be overcome before a junction or connection of the parts can be effected, and the inevitable result in such case is the splashing of water upon the operator. But in my coupling the parts are set up or joined by a movement transversely to the direction of the stream, and therefore encounters the least resistance therefrom, and the operator is saved a sprinkling; and it will be seen that as soon as the flanges of the male part have entered the grooves in the holding devices the parts are actually caught or linked together in readiness to advance to complete the joint with the greatest facility. From its simplicity of construction it will not be expensive. Another advantage in this particular use of the coupling will be the facility of repair or replacement.

At present there is but one source of supply for couplings for the fire departments, and the same screw-thread for all, and hence the difficulty of supply or repair at the various localities. With a coupling like mine no such difficulty will be experienced, and the coupling can be repaired by any common machine-shop.

What I claim as my improvement is—

1. The hose-coupling consisting of the two parts so constructed and applied that they shall be secured when brought together by a movement transversely to the direction of the water-course, as set forth.

2. The means herein shown and described by which the two parts of the coupling can be linked or held in position to advance and complete the joint, as set forth.

3. A hose-coupling in which one of the parts is set or pressed up against a washer embedded in or permanently secured to the face of the other part, as herein set forth.

In testimony whereof I have signed my name to this specification before two subscribing witnesses.

R. J. FALCONER.

Witnesses:
A. POLLOK,
EDM. F. BROWN.